United States Patent
Park et al.

(10) Patent No.: US 11,252,568 B1
(45) Date of Patent: Feb. 15, 2022

(54) METHOD AND APPARATUS FOR REARRANGING TRAFFIC DATA

(71) Applicant: KOREA INTERNET & SECURITY AGENCY, Jeollanam-do (KR)

(72) Inventors: Seong Min Park, Jeollanam-do (KR);
Do Won Kim, Jeollanam-do (KR);
Hyung Jin Cho, Jeollanam-do (KR);
Young Kwon Park, Jeollanam-do (KR); Sung Moon Kwon, Jeollanam-do (KR)

(73) Assignee: KOREA INTERNET & SECURITY AGENCY, Jeollanam-do (KR)

( * ) Notice: Subject to any disclaimer, the term of this patent is extended or adjusted under 35 U.S.C. 154(b) by 0 days.

(21) Appl. No.: 17/332,875

(22) Filed: May 27, 2021

(30) Foreign Application Priority Data

Nov. 16, 2020 (KR) .................. 10-2020-0152474

(51) Int. Cl.
*H04W 12/122* (2021.01)
*H04W 12/72* (2021.01)
*H04W 76/27* (2018.01)
*H04W 76/38* (2018.01)

(52) U.S. Cl.
CPC ......... *H04W 12/122* (2021.01); *H04W 12/72* (2021.01); *H04W 76/27* (2018.02); *H04W 76/38* (2018.02)

(58) Field of Classification Search
CPC ... H04W 12/122; H04W 76/38; H04W 76/27; H04W 12/72
See application file for complete search history.

(56) References Cited

U.S. PATENT DOCUMENTS

| | | | |
|---|---|---|---|
| 2009/0175186 A1* | 7/2009 | Du ..................... | H04W 76/28 370/252 |
| 2010/0118752 A1* | 5/2010 | Suzuki ................ | H04W 76/28 370/311 |
| 2011/0269463 A1* | 11/2011 | Wang ................ | H04W 52/0232 455/436 |
| 2012/0120812 A1* | 5/2012 | Gerber ............... | H04L 43/0864 370/249 |
| 2012/0122405 A1* | 5/2012 | Gerber ............. | H04W 52/0232 455/67.11 |
| 2012/0281561 A1* | 11/2012 | Shukla ................ | H04W 76/38 370/252 |
| 2013/0064186 A1 | 3/2013 | Wang et al. | |

(Continued)

FOREIGN PATENT DOCUMENTS

| | | |
|---|---|---|
| JP | 2013-530630 A | 7/2013 |
| KR | 10-1447677 B1 | 9/2014 |

(Continued)

*Primary Examiner* — Dinh Nguyen
(74) *Attorney, Agent, or Firm* — Sheppard Mullin Richer & Hampton LLP

(57) ABSTRACT

Provided is a method for rearranging traffic data performed by a computing device. The method comprises obtaining traffic data transmitted and received between a base station and a terminal, calculating a value of a Radio Resource Control (RRC) inactivity timer based on a RRC release message included in the traffic data, determining a size of a time window using the calculated value of the RRC inactivity timer and rearranging, for each time window having the determined size, the traffic data of a target terminal by an RRC connection request time.

20 Claims, 12 Drawing Sheets

(56) References Cited

U.S. PATENT DOCUMENTS

| | | | | |
|---|---|---|---|---|
| 2013/0260740 A1* | 10/2013 | Rayavarapu | .......... | H04W 76/27 |
| | | | | 455/422.1 |
| 2014/0098694 A1* | 4/2014 | Damji | ............... | H04W 52/0229 |
| | | | | 370/252 |
| 2015/0245358 A1* | 8/2015 | Schmidt | .............. | H04L 43/0888 |
| | | | | 370/329 |
| 2015/0271755 A1* | 9/2015 | Karri | ................. | H04W 28/0221 |
| | | | | 370/252 |
| 2016/0242191 A1* | 8/2016 | Liao | ...................... | H04W 24/10 |
| 2017/0019820 A1* | 1/2017 | Das | ................... | H04W 36/0016 |

FOREIGN PATENT DOCUMENTS

| | | |
|---|---|---|
| KR | 10-1501698 B1 | 3/2015 |
| KR | 10-1586626 B1 | 1/2016 |
| KR | 10-2030837 B1 | 10/2019 |
| KR | 10-2020-0017424 A | 2/2020 |

\* cited by examiner

| SessionCreateTime | | RequestTime | | ResponseTime | |
|---|---|---|---|---|---|
| 2020-05-13 | 10:08:38.753379 | 2020-05-13 | 10:08:38.747463 | 2020-05-13 | 10:08:38.753185 |
| 2020-05-13 | 10:08:38.787957 | 2020-05-13 | 10:08:38.787331 | 2020-05-13 | 10:08:38.787752 |
| 2020-05-13 | 10:08:39.389162 | 2020-05-13 | 10:08:39.388421 | 2020-05-13 | 10:08:39.388964 |
| 2020-05-13 | 10:08:41.398611 | 2020-05-13 | 10:08:41.397578 | 2020-05-13 | 10:08:41.398330 |
| 2020-05-13 | 10:09:15.618684 | 2020-05-13 | 10:09:15.617830 | 2020-05-13 | 10:09:15.618528 |
| 2020-05-13 | 10:09:16.309209 | 2020-05-13 | 10:09:16.308279 | 2020-05-13 | 10:09:16.309064 |
| 2020-05-13 | 10:09:16.899692 | 2020-05-13 | 10:09:16.898772 | 2020-05-13 | 10:09:16.899527 |
| 2020-05-13 | 10:09:17.048114 | 2020-05-13 | 10:09:17.047136 | 2020-05-13 | 10:09:17.047859 |
| 2020-05-13 | 10:09:17.439417 | 2020-05-13 | 10:09:17.438304 | 2020-05-13 | 10:09:17.439235 |
| 2020-05-13 | 10:09:49.638207 | 2020-05-13 | 10:09:49.637350 | 2020-05-13 | 10:09:49.638075 |
| 2020-05-13 | 10:09:49.938432 | 2020-05-13 | 10:09:49.937680 | 2020-05-13 | 10:09:49.938272 |
| 2020-05-13 | 10:09:50.397636 | 2020-05-13 | 10:09:50.396847 | 2020-05-13 | 10:09:50.397470 |
| 2020-05-13 | 10:10:00.997036 | 2020-05-13 | 10:10:00.996509 | 2020-05-13 | 10:10:00.996761 |
| | | | | | |
| 2020-05-13 | 10:09:49.866478 | 2020-05-13 | 10:09:49.865926 | 2020-05-13 | 10:09:49.866225 |
| 2020-05-13 | 10:09:49.938432 | 2020-05-13 | 10:09:49.937680 | 2020-05-13 | 10:09:49.938272 |
| 2020-05-13 | 10:09:49.938574 | 2020-05-13 | 10:09:49.937654 | 2020-05-13 | 10:09:49.938367 |

| Key | Value | |
| --- | --- | --- |
| IMSI | RRCRecentPacketTime (YYYYMMDDHHMMSS) | RRCReleaseTime (YYYYMMDDHHMMSS) |
| 30 | 32 | 34 |

FIG. 6

| Key | Value | | |
|---|---|---|---|
| IMSI — 30 | RRCInactivity Timer(SS) — 42 | Detection Duration (MMSS) — 40 | Time Window(MMSS) — 44 |

FIG. 8

METHOD AND APPARATUS FOR REARRANGING TRAFFIC DATA

This application claims the benefit of Korean Patent Application No. 10-2020-0152474, filed on Nov. 16, 2020, in the Korean Intellectual Property Office, the disclosure of which is incorporated herein by reference in its entirety.

BACKGROUND

Field

The present disclosure relates to a method and apparatus for rearranging traffic data. More specifically, the present disclosure relates to a method and apparatus for rearranging traffic data so that the reversal of a session creation time is adjusted by collecting traffic data transmitted and received between a base station and a terminal constituting a mobile communication network.

Description of the Related Art

Today's smartphone users are using a number of mobile services based on a high-speed mobile communication network. These mobile services are becoming indispensable elements in modern life. The importance of a security technology related to a mobile communication network, which is essential for users to safely use mobile services, has emerged.

For example, there is a need for a security technology against attacks that maliciously occupy limited radio resources of a mobile communication network. This type of attack causes a failure of the mobile communication network equipment that manages radio resources of the mobile communication network by inducing a large number of signaling messages or increasing traffic. Examples of this type of attack include Denial of Service (DoS), scanning, and flooding.

Security technologies related to conventional mobile communication networks have developed in the direction of detecting or preventing individual attack types. However, detection techniques related to attacks that maliciously occupy limited radio resources have a problem in that they cannot detect abnormal traffic due to reversal phenomenon of session creation time occurring in LTE EMM (EPS Mobility Management). According to such a conventional technique, by determining abnormal traffic as normal traffic, a failure of a mobile communication network equipment managing radio resources is caused.

There is a need for a technique for adjusting the reversal phenomenon of the session creation time.

SUMMARY

The technical problem to be solved by some embodiments of the present disclosure is to provide a method and an apparatus for adjusting the reversal phenomenon of the session creation time.

Another technical problem to be solved by some embodiments of the present disclosure is to provide a method and apparatus for improving abnormal traffic detection performance.

Another technical problem to be solved by some embodiments of the present disclosure is to provide a method and apparatus for improving attack detection performance for a mobile communication network.

The technical problems of the present disclosure are not limited to the technical problems mentioned above, and other technical problems that are not mentioned will be clearly understood by those skilled in the art from the following description.

According to a method for rearranging traffic data performed by a computing device including, obtaining traffic data transmitted and received between a base station and a terminal, calculating a value of a Radio Resource Control (RRC) inactivity timer based on a RRC release message included in the traffic data, determining a size of a first time window using the calculated value of the RRC inactivity timer and rearranging, for each time window having the determined size, the traffic data of a target terminal by an RRC connection request time.

According to an embodiment, the method further includes, analyzing the rearranged traffic data and detecting abnormal traffic based on the analysis of the rearranged traffic data.

According to an embodiment, wherein detecting the abnormal traffic includes, obtaining the rearranged traffic data corresponding to a second time window between a first point of time and a second point of time, the second time window having the determined size and determining the rearranged traffic data as abnormal traffic based on a first score derived from the second time window being greater than or equal to a preset threshold.

According to an embodiment, wherein the first score is determined based on an accumulated number of messages that include the RRC release message and an RRC connection request message, the RRC release message and the RRC connection request message being transmitted and received by the terminal.

According to an embodiment, wherein the first score is determined based on an accumulated number of times that no Session Initiation Protocol (SIP) response message has been generated for a SIP request message transmitted by the target terminal.

According to an embodiment, the method further includes, obtaining the rearranged traffic data corresponding to a third time window between a third point of time and a fourth point of time, the third point of time being after a reference time interval from the first point of time, the third time window having the determined size and determining the rearranged traffic data as abnormal traffic based on the second score derived from the third time window being greater than or equal to a preset threshold.

According to an embodiment, wherein a length of the reference time interval is equal to the determined size of the first time window.

According to an embodiment, wherein detecting the abnormal traffic includes, obtaining the rearranged traffic data corresponding to a second time window between a first point of time and a second point of time, the second time window having the determined size and determining the rearranged traffic data as abnormal traffic based on statistical data derived from the rearranged traffic data corresponding to the second time window.

According to an embodiment, wherein obtaining the traffic data includes, obtaining, in real time, the traffic data transmitted and received between the base station and the terminal.

According to an embodiment, wherein calculating the value of the RRC inactivity timer includes, measuring a length of time between a last RRC message and the RRC release message, the last RRC message being included in the traffic data and determining the measured length of time as the value of the RRC inactivity timer.

According to an embodiment, wherein determining the size of the first time window includes, calculating a sum of the value of the RRC inactivity timer and a length of a detection duration and determining the calculated sum as the size of the first time window.

According to an embodiment, wherein the length of the detection duration is a value determined based on a type of abnormal traffic.

According to an embodiment, wherein the target terminal is identified by International Mobile Subscriber Identity (IMSI) data included in the traffic data.

According to another aspect of the present disclosure, an apparatus for rearranging traffic data including a processor, a network interface, a memory and a computer program loaded into the memory and executed by the processor, wherein the computer program includes, an instruction for obtaining traffic data transmitted and received between a base station and a terminal, an instruction for calculating a value of a Radio Resource Control (RRC) inactivity timer based on a RRC release message included in the traffic data, an instruction for determining a size of a time window using the calculated value of the RRC inactivity timer and an instruction for rearranging, for each time window having the determined size, the traffic data of a target terminal by an RRC connection request time.

According to another aspect of the present disclosure, a computer-readable recording medium recording a computer program for rearranging traffic data including computer program instructions executable by a processor, wherein the computer program instructions are executed by a processor of a computing device for performing operations including, obtaining traffic data transmitted and received between a base station and a terminal, calculating a value of a Radio Resource Control (RRC) inactivity timer based on a RRC release message included in the traffic data, determining a size of a time window using the calculated value of the RRC inactivity timer and rearranging, for each time window having the determined size, the traffic data of a target terminal by an RRC connection request time.

BRIEF DESCRIPTION OF THE DRAWINGS

These and/or other aspects will become apparent and more readily appreciated from the following description of the embodiments, taken in conjunction with the accompanying drawings in which:

FIG. 4 is an exemplary diagram of traffic reflecting the reversal phenomenon of session creation time described with reference to FIG. 3.

FIG. 5 is a diagram for describing in more detail an operation of calculating an RRC inactivity timer value in the traffic data rearrangement method described with reference to FIG. 2.

FIG. 6 is a diagram for describing in more detail an RRC inactivity timer value described with reference to FIG. 5.

FIG. 8 is a diagram for describing in more detail the size of the time window described with reference to FIG. 6.

DETAILED DESCRIPTION

Figure 1:
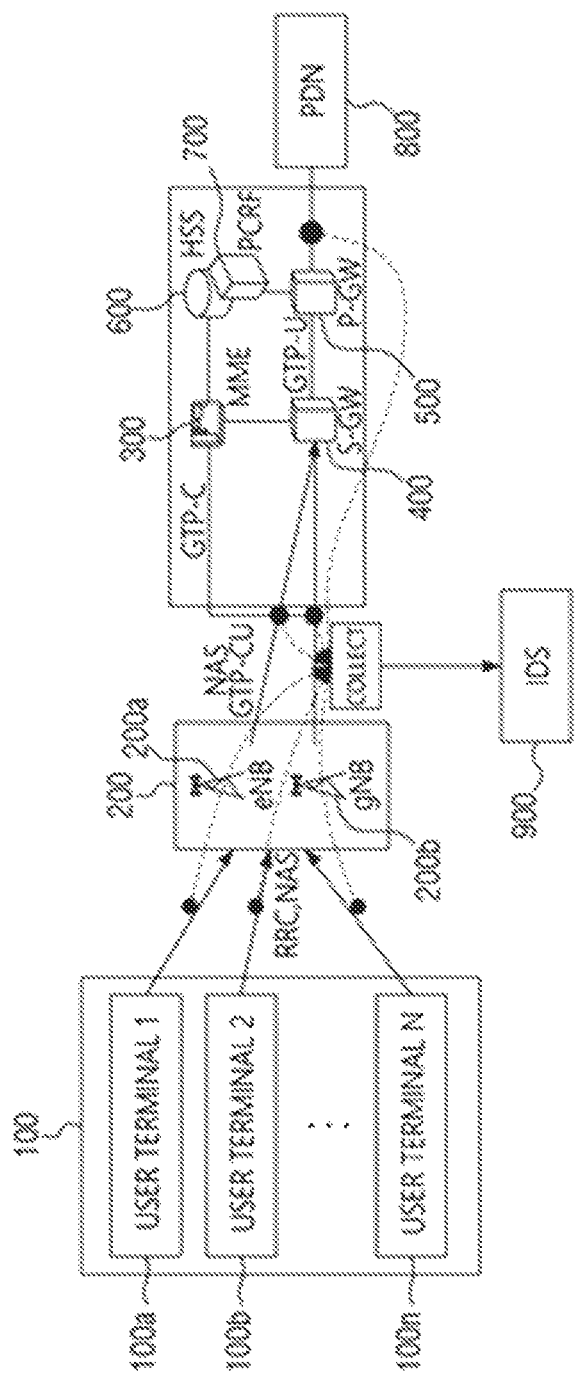
FIG. 1 is a diagram for describing a traffic data rearrangement system according to an embodiment of the present disclosure.

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments may be provided so that this disclosure will be thorough and complete and will fully convey the concept of the disclosure to those skilled in the art, and the present disclosure will be defined by the appended claims.

In adding reference numerals to the components of each drawing, it should be noted that the same reference numerals may be assigned to the same components as much as possible even though they are shown in different drawings. In addition, in describing the present disclosure, based on it being determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries may not be ideally or excessively interpreted unless they are specifically defined clearly. The terminology used herein may be for the purpose of describing embodiments and may not be intended to be limiting of the present disclosure. In this specification, the singular also includes the plural unless specifically stated otherwise in the phrase.

In addition, in describing the component of the present disclosure, terms, such as first, second, A, B, (a), (b), can be used. These terms may be for distinguishing the components from other components, and the nature or order of the components may not be limited by the terms. Based on a component being described as being "connected," "coupled" or "contacted" to another component, that component may be directly connected to or contacted with that other component, but it should be understood that another component also may be "connected," "coupled" or "contacted" between each component.

Hereinafter, some embodiments of the present disclosure will be described in detail with reference to the accompanying drawings.

FIG. 1 is an exemplary diagram for describing a traffic data rearrangement system according to an embodiment of the present disclosure. Referring to FIG. 1, the traffic data rearrangement system may include a user terminal 100, a base station 200, MME (Mobility Management Entity) 300, S-GW (Serving Gateway) 400, P-GW (Packet Data Network Gateway) 500, HSS (Home Subscriber Server) 600, PCRF (Policy and Charging Rule Function) 700, PDN (Packet Data Network) 800, and IDS (Intrusion Detection System) 900. Each of the components of the traffic data rearrangement system disclosed in FIG. 1 represents functional components that may be functionally divided, and any one or more components may be integrated and implemented with each other in an actual physical environment. Hereinafter, components of the traffic data rearrangement system will be described in more detail.

FIG. 1 shows a plurality of user terminals connected to a mobile communication network. For example, a first user terminal 100a, a second user terminal 100b, and a Nth user terminal 100n may be illustrated. It should be noted that FIG. 1 illustrates a plurality of user terminals connected to a mobile communication network, and the present disclosure may not be limited to the number of user terminals 100 shown in FIG. 1.

Such user terminal 100 may be connected to the base station 200 through a radio interface (e.g. RAN). Here, the protocol for controlling the radio interface may be RRC (Radio Resource Control), and mainly performs functions related to radio bearer setting, reset, and release.

Next, the base station 200 may be connected to the user terminal 100, the MME 300 and the S-GW 400. The base station may be configured with the eNB 200a or the gNB 200b. Here, the eNB 200a may refer to a base station used in an LTE system that supports interworking between LTE Radio technology and Evolved Packet Core (EPC). Next, the gNB 200b may denote a next-generation base station that supports interworking with New Radio technology and a 5G core. The 5G structure shown in FIG. 1 may be shown as a non-standalone (NSA) structure, but the present disclosure may not be limited thereto, and all base stations applicable to a 5G mobile communication network may be included in the present disclosure.

Next, the MME 300 may be connected to the base station 200 and may also be connected to the S-GW 400, the P-GW 500 and the HSS 600. The MME 30 may manage the user terminal 100 in an idle mode and also plays a role of paging the user terminal 100. The MME 300 may process a signal for the user terminal 100 to interwork with the EPC network.

Next, the S-GW 400 may be connected to the base station 200 and may also be connected to the MME 300 and the P-GW 500. Based on the user terminal 100 starting data service while the user terminal 100 may be connected to the base station 200, the S-GW 400 delivers and routes user traffic to the base station 200 and the EPC network. Further, the S-GW 400 may manage the data service not to be disconnected even based on the user terminal 100 handing-over or roaming.

Next, the P-GW 500 may allocate an IP address of the user terminal 100, connect with the PDN 800, and perform a function of exchanging and processing packet data in the EPC network. Further, the P-GW 500 may determine a bearer band, and performs forwarding and routing functions for packet data.

At this time, in a typical 3GPP technology, an interface between the base station 200 and the S-GW 400 may be called the S1 interface, an interface between the MME 300 and the S-GW 400 may be called the S11 interface, and an interface between the S-GW 400 and the P-GW 500 may be called the S5 interface.

Next, the HSS 600 may be a central database having user profile data, and may be connected to the MME 300 to provide user authentication data and user profile data to the MME 300.

Next, the PCRF 700 performs a policy and billing control function. At this time, the PCC rule generated by the PCRF 700 may be transmitted to the P-GW 500.

Some configurations according to the present embodiment described so far with reference to FIG. 1 are general devices constituting a 5G mobile communication network and can be clearly understood by those skilled in the 5G communication related field, so a more detailed description of each configuration will be omitted.

Next, the IDS 900, as an intrusion detection system, may perform a function of detecting abnormal traffic in the mobile communication network shown in FIG. 1. For example, the IDS 900 collects traffic data transmitted/received between the base station 200 and the user terminal 100, and rearranges the traffic data of the target terminal. The IDS 900 analyzes the rearranged traffic data, and determines whether the traffic data may be normal.

Further, the traffic data collected by the IDS 900 may not be limited to traffic data transmitted and received between the base station 200 and the user terminal 100, and includes traffic data from all connection points of the mobile communication network, for example, between the base station 200 and the MME 300, between the base station 200 and S-GW 400, between S-GW 400 and P-GW 500, and between P-GW 500 and PDN 800.

Figure 12:
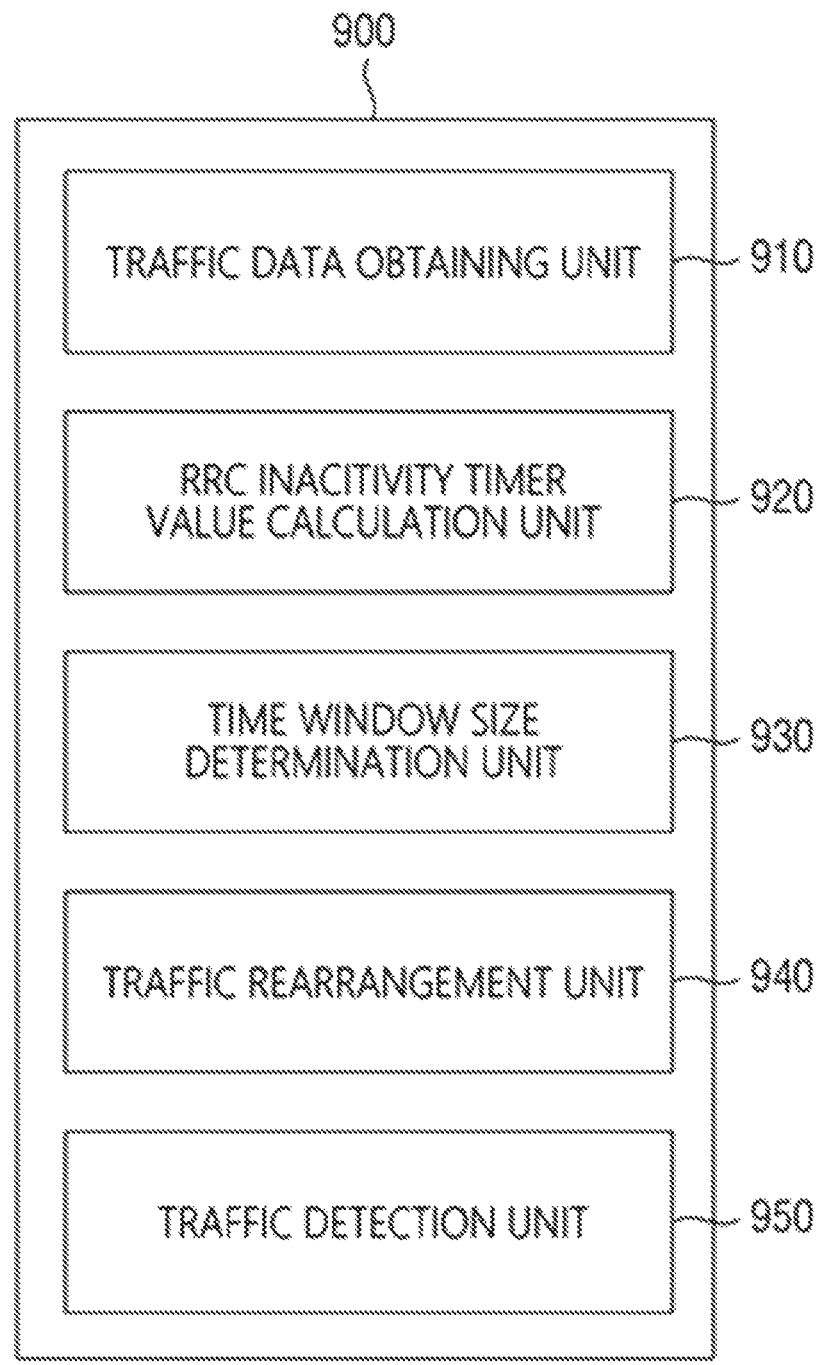
FIG. 12 is a block diagram of an apparatus for rearranging traffic data described with reference to FIG. 11.

Further, in some embodiments, the IDS 900 may be configured as a traffic data rearrangement apparatus according to another embodiment of the present disclosure. Referring to FIG. 12 for a more detailed description, the IDS 900 may include a traffic data obtaining unit 910, an RRC inactivity timer value calculation unit 920, a time window size determination unit 930, a traffic rearrangement unit 940, and a traffic detection unit 950. Operations performed by each component constituting the IDS 900 will be specified through description of the specification later.

In the above, a traffic data rearrangement system according to an embodiment of the present disclosure has been described in detail with reference to FIG. 1. According to the present embodiment described with reference to FIG. 1, by detecting abnormal traffic by the IDS 900, it may be possible to prevent the occurrence of a failure of devices managing radio resources in a mobile communication network due to the abnormal traffic. For example, by rearranging the traffic data, the reversal phenomenon of the session creation time that may occur in LTE EMM can be eliminated, and abnormal traffic can be more accurately detected.

Hereinafter, a traffic data rearrangement method according to another embodiment of the present disclosure will be described in detail with reference to FIGS. 2 to 10. Prior to describing a traffic data rearrangement method according to another embodiment of the present disclosure with reference to FIG. 2, the reversal phenomenon of the session creation time and the problem of not generating a detection message of the prior art that occurred therefrom will be described with reference to FIGS. 3 and 4.

Figure 3:
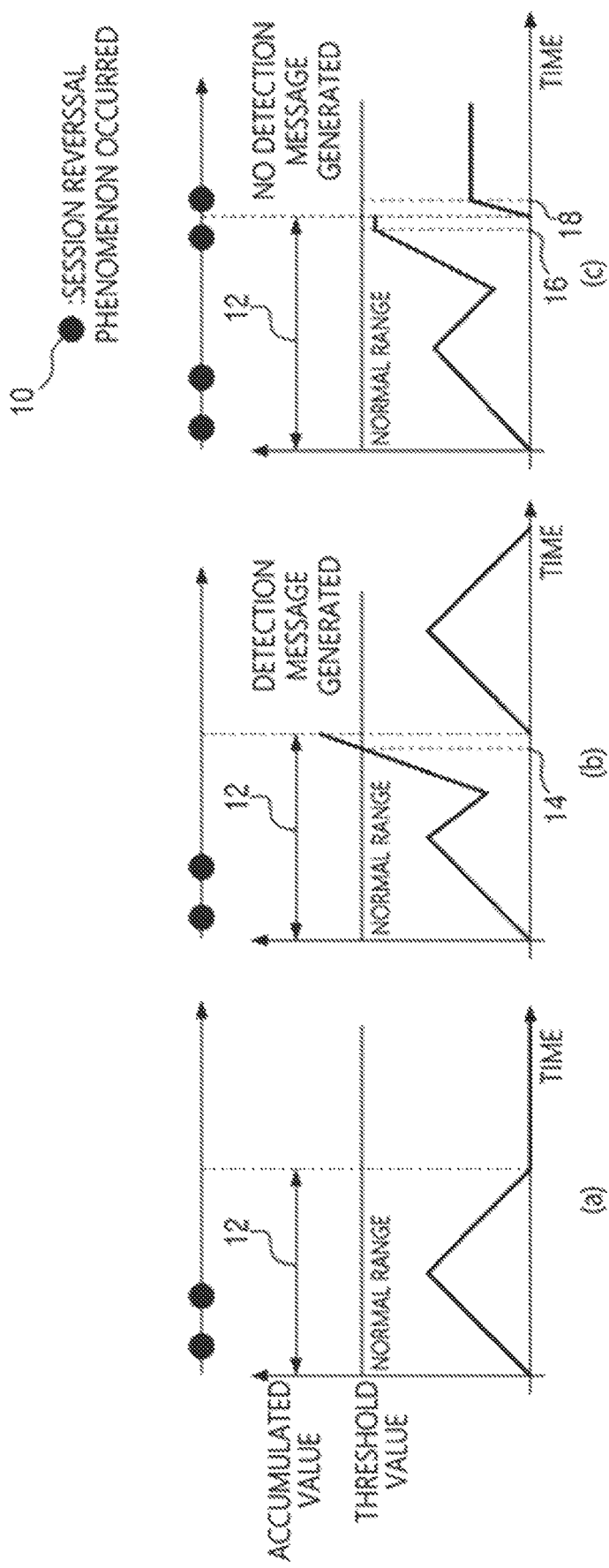
FIG. 3 is a diagram for describing a reversal phenomenon of session creation time, which can be referred to in some embodiments of the present disclosure.

FIG. 3 is an exemplary diagram for describing the reversal phenomenon of a session creation time that may be referred to in some embodiments of the present disclosure, and FIG. 4 is an exemplary view of traffic reflecting the reversal phenomenon of a session creation time described with reference to FIG. 3.

Referring to 3(a) to 3(c), detection techniques for attacks that maliciously occupy limited radio resources detect abnormal traffic based on whether the accumulated value accumulated by processing the traffic data collected in the detection period 12 being equal to or greater than a threshold value. However, the present disclosure may not be limited thereto, and other detection techniques related to attacks that maliciously occupy limited radio resources detect abnormal traffic based on statistical information about traffic collected in the detection period 12 by comparing it with statistical information about traffic collected in past. That is, the detection period 12, in which traffic is collected, may be a factor in detecting abnormal traffic.

Referring to FIG. 3(*a*), in the case of normal traffic, since the accumulated value accumulated by processing the traffic data collected in the detection period 12 may be less than the threshold value, a detection message may not be generated. Referring to FIG. 3(*b*), in the case of abnormal traffic, since the accumulated value accumulated by processing the traffic data collected in the detection period 12 exceeds the threshold value at the excess point 14, a detection message may be generated.

On the other hand, referring to FIG. 3(*c*), a detection message may not be generated due to the session reversal phenomenon 10 even though the traffic may be abnormal. For example, data to be accumulated at the first point 16 may be accumulated at the second point 18 by the session reversal phenomenon 10, so that a detection message may not be generated. As described above, there may be a problem in that traffic data to be detected as abnormal traffic may be determined as normal traffic by the session reversal phenomenon 10. FIG. 4 will be referred to describe in more detail the session reversal phenomenon 10 causing this problem.

Referring to FIG. 4, a table, in which collected traffic is processed, may be shown. For example, the RRC connection request time 20, the RRC connection request response time 22, and the session creation time 24 may be shown.

Here, the first request time 26*a* may be 10:09:49.937680 seconds on May 13, 2020, and the time based on the session being created may be 10:09:49.938432 seconds on May 13, 2020. Further, the second request time 26*b* may be 10:09:49.937654 on May 13, 2020, and the time based on the session being created may be 10:09:49.938574 on May 13, 2020. That is, the first request time 26*a* may be generated after the second request time 26*b*, but in the session creation time in response to each request, the creation of the session according to the second request time 26*b* takes precedence over the creation of the session according to the first request time 26*a*. In this way, a phenomenon, in which a session is generated by reversing the RRC connection request time sequence, may be referred to as a session reversal phenomenon 10.

This session reversal phenomenon 10 may be due to the 'S1 Release Procedure' and 'Service Request Procedure' of LTE EMM, and this may be a matter that can be clearly understood by those skilled in the 5G communication related field, so a detailed description of the cause of occurrence of the session reversal phenomenon 10 will be omitted.

The session creation time reversal phenomenon described with reference to FIGS. 3 to 4 and the problem of not generating a detection message of the prior art that occurred therefrom can be solved by a method of rearranging traffic data to be described later. Hereinafter, a method of rearranging traffic data will be described with reference to FIG. 2.

Figure 2:
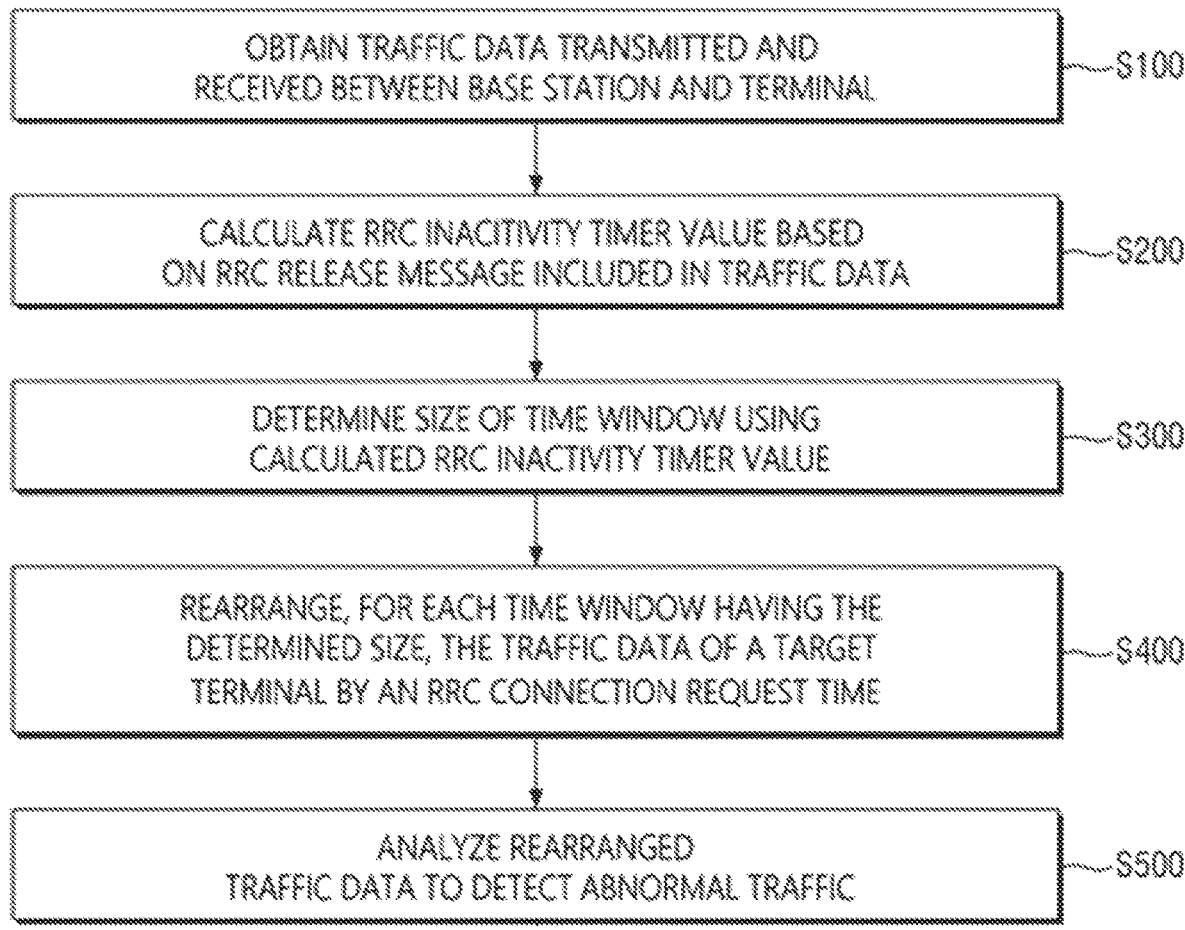
FIG. 2 is a diagram for describing a traffic data rearrangement method according to another embodiment of the present disclosure.

FIG. 2 is an exemplary diagram illustrating a traffic data rearrangement method according to another embodiment of the present disclosure. The traffic data rearrangement method according to the present embodiment may be performed by a computing device. For example, the traffic data rearrangement method according to the present embodiment may be performed by the traffic data rearrangement apparatus shown in FIG. 12. Further, the method according to the present embodiment may be performed by being divided by the first computing device and the second computing device. Hereinafter, in performing each operation of the method according to the present embodiment, based on the description of the subject being omitted, the subject may be interpreted as being the computing device.

Referring to FIG. 2, in step S100, traffic data transmitted and received between a base station and a terminal may be obtained. Here, the traffic data may include a signaling message. This signaling message may include an RRC connection message or an RRC release message.

Further, the traffic data may include traffic data of each of a plurality of user terminals connected to the mobile communication network. For example, a normal user terminal transmitting and receiving normal traffic and an abnormal user terminal transmitting and receiving abnormal traffic may be connected to a mobile communication network, and traffic data transmitted and received by the normal user terminal and the abnormal user terminal may be collected. Here, each of the terminals connected to the mobile communication network may be identified by an IMSI (International Mobile Subscriber Identity) included in the traffic data.

In some embodiments related to step S100, in the step of obtaining traffic data, traffic data transmitted and received between the base station and the terminal may be obtained in real time. According to the present embodiment, since traffic data may be collected in real time, it may be possible to protect devices constituting a mobile communication network by detecting abnormal packets in real time.

The operation performed in step S100 described above may be performed, for example, by the traffic data obtaining unit 910 shown in FIG. 12.

Next, in step S200, based on the RRC release message included in the traffic data, an RRC inactivity timer value may be calculated. Here, the RRC inactivity timer value may be an unused time of the user terminal to release the RRC connection, and the RRC inactivity timer value may be a unique value stored in the base station. The RRC inactivity timer value may have a unique value that may be different for each communication service provider.

In some embodiments related to step S200, calculating the RRC inactivity timer value may include calculating a time from the transmission/reception time of the last RRC message included in the traffic data to the transmission/reception time of the RRC release message as an RRC inactivity timer value. For a detailed description related to this, it will be described with reference to FIGS. 5 to 6.

Figure 5:
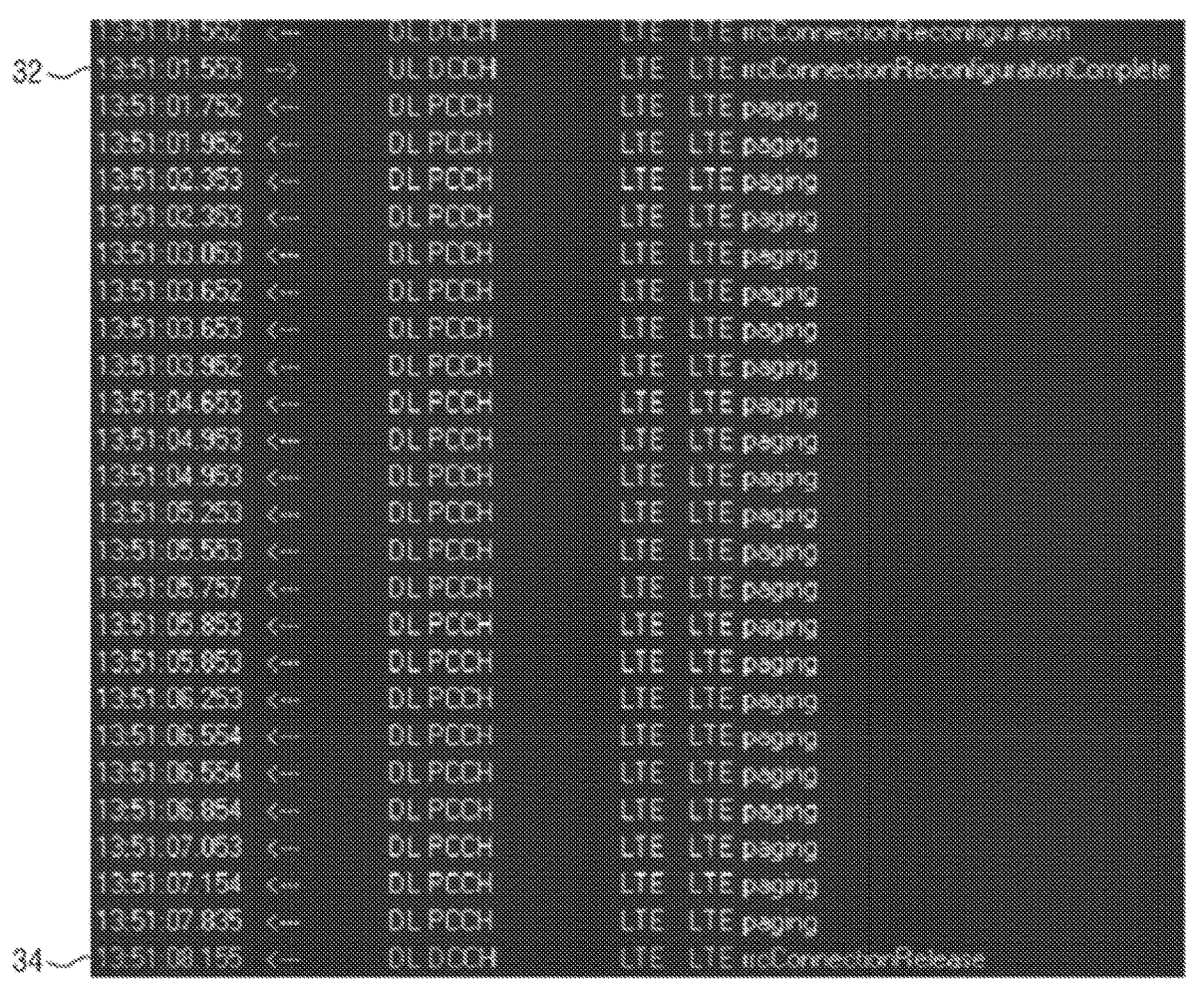

FIG. 5 is a diagram for describing in more detail an operation of calculating an RRC inactivity timer value of the traffic data rearrangement method described with reference to FIG. 2, and FIG. 6 is a diagram for describing in detail the RRC inactivity timer value described with reference to FIG. 5.

Referring to FIG. 5, a transmission/reception time 32 of the last RRC message and a transmission/reception time 34 of the RRC release message may be shown. For example, the last RRC message transmission/reception time 32 may be 13:51:01.553 seconds, and the RRC release message transmission/reception time 34 may be 13:51:08.155 seconds. At this time, the RRC inactivity timer value may be a time obtained by subtracting the transmission/reception time 32 of the last RRC message from the transmission/reception time 34 of the RRC release message, and may be calculated as 6.602 seconds. However, it should be noted that the RRC inactivity timer value shown in FIG. 5 may be an exemplary value and does not limit the scope of the present disclosure.

In some embodiments related to the RRC inactivity timer value, the RRC inactivity timer value may be calculated as a value rounded from a given decimal place. For example, based on a value rounded from the third decimal place being calculated as the RRC inactivity timer value, the RRC inactivity timer value shown in FIG. 5 may be calculated as 6.60 seconds. For another example, based on the value rounded from the second decimal place being calculated as the RRC inactivity timer value, the RRC inactivity timer value shown in FIG. 5 may be calculated as 6.6 seconds.

Referring to FIG. 6, an example of a table storing RRC inactivity timer values described with reference to FIG. 5 is shown. The transmission/reception time 32 of the last RRC message and the transmission/reception time 34 of the RRC release message described above may be stored for each IMSI 30, which may be set as a unique value for each user terminal. Further, unlike FIG. 6, the RRC inactivity timer value may be calculated and stored for each IMSI 30.

The operation performed in step S200 described above may be performed, for example, by the RRC inactivity timer value calculation unit 920 illustrated in FIG. 12. It will be described with reference to FIG. 2 again.

Next, in step S300, the calculated RRC inactivity timer value may be used to determine the size of the time window. Here, the time window may be a reference for rearranging the collected traffic. Further, the time window may be a reference for analyzing the rearranged traffic.

In some embodiments related to step S300, determining the size of the time window may include determining a value obtained by adding the RRC inactivity timer value to the predetermined length of detection duration as the size of the time window. For a detailed description related to this, it will be described with reference to FIGS. 7 and 8.

Figure 7:
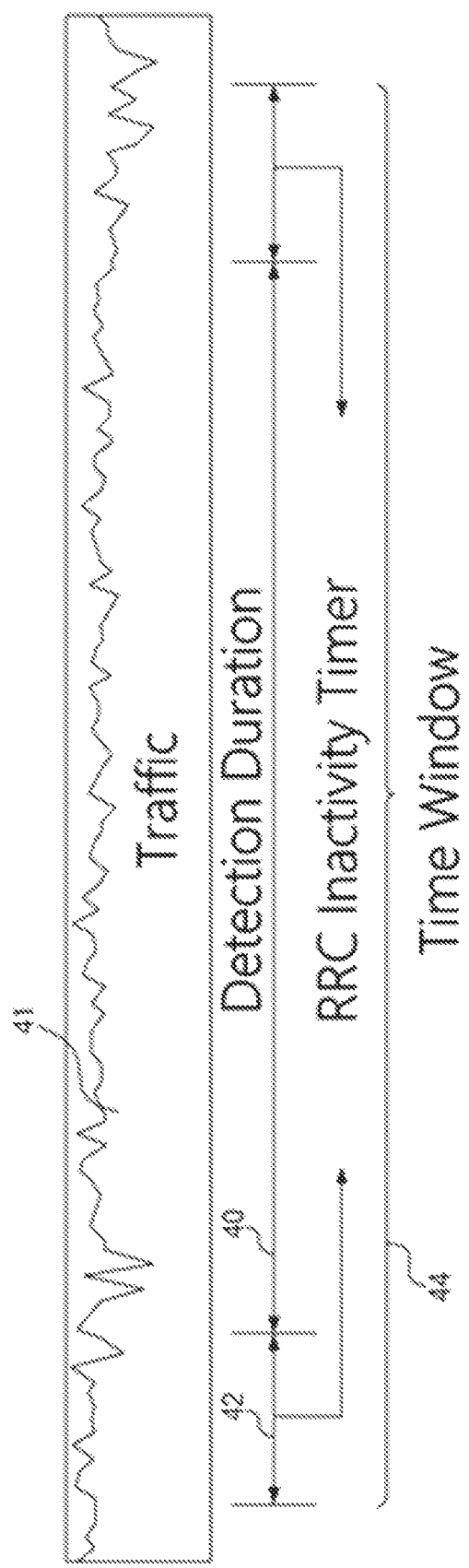
FIG. 7 is a diagram for describing in more detail an operation of determining the size of a time window in the traffic data rearrangement method described with reference to FIG. 2.

FIG. 7 is an exemplary diagram for describing in more detail an operation of determining the size of a time window in the method for rearranging traffic data described with reference to FIG. 2, and FIG. 8 is an exemplary diagram for describing in more detail the size of the time window described with reference to FIG. 6.

Referring to FIG. 7, traffic 41 may be shown. At this time, a time window 44, which may be a reference for rearranging or analyzing the traffic 41, is also shown. The size of the time window 44 may be expressed as a value obtained by adding a value of each of the length of the detection duration 40 and the value of the RRC inactivity timer 42. The size of the time window 44 shown in FIG. 7 may be expressed as a value obtained by adding twice the value of the RRC inactivity timer 42 to the length of the detection duration 40. As such, the size of the time window 44 may be determined based on the value of the RRC inactivity timer 42.

Referring to FIG. 8, an example of a table storing the size of the time window 44 described with reference to FIG. 7 may be shown. The length of the detection duration 40, the value of the RRC inactivity timer 42 and the size of the time window 44 described above may be stored for each IMSI 30. Further, unlike FIG. 8, the size of the time window 44 may be stored for each IMSI 30.

In some other embodiments related to step S300, the detection duration size constituting the time window may be a value determined based on the type of abnormal traffic to be detected. According to the present embodiment, an appropriate detection duration may be determined in advance according to the type of abnormal traffic to be detected, and an RRC inactivity timer value may be added thereto, so that the time window can be dynamically determined according to a detection rule of the abnormal traffic to be detected.

The operation performed in step S300 described above may be performed, for example, by the time window size determination unit 930 illustrated in FIG. 12. It will be described with reference to FIG. 2 again.

Next, in step S400, the traffic data of the target terminal included may be rearranged in the order of the RRC connection request time for each size unit of the time window. For example, referring to FIG. 4 described above, the traffic data of the first request time 26a and the traffic data of the second request time 26b may be rearranged in the order of the RRC connection request time. In this case, the traffic data of the first request time 26a, which may be temporally lower than the second request time 26b, is rearranged in an order following the traffic data of the second request time 26b. According to the present embodiment, the size of the time window may be dynamically determined to correct the session reversal phenomenon, and the traffic collected for each size of the determined time window may be rearranged in the order of the RRC connection request time, correcting the session reversal phenomenon.

The operation performed in step S400 described above may be performed, for example, by the traffic rearrangement unit 940 illustrated in FIG. 12.

Next, in step S500, the rearranged traffic data may be analyzed to detect abnormal traffic. Here, the traffic may mean traffic data transmitted and received by the target terminal that maliciously occupies limited radio resources. According to the present embodiment, by analyzing the traffic data rearranged in the order of the request time of the terminal, a session reversal phenomenon may be corrected, and the problem of not generating a detection message of abnormal traffic described with reference to FIG. 3 may be solved.

Figure 9:
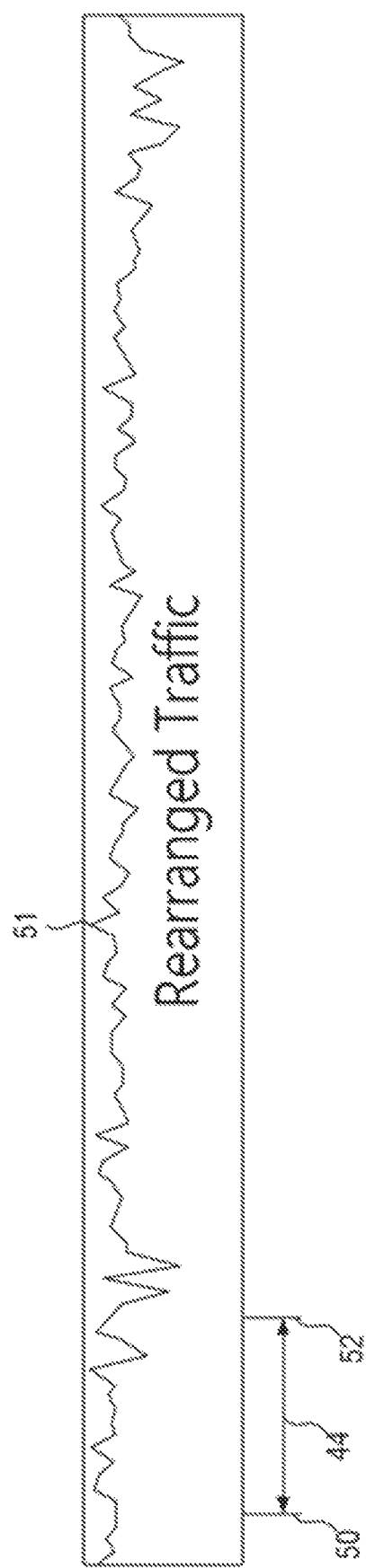
FIGS. 9 and 10 are diagrams for describing in more detail an operation of analyzing traffic data rearrangement method described with reference to FIG. 2.

In some embodiments related to step S500, detecting abnormal traffic may include obtaining rearranged traffic data corresponding to the first time window between the first point of time and the second point of time, and determining the rearranged traffic data as abnormal traffic based on a first score derived from the first time window being greater than or equal to a threshold. For a detailed description related to this, it will be described with reference to FIG. 9. FIG. 9 may be a diagram for describing in more detail an operation of analyzing the traffic data rearrangement method described with reference to FIG. 2.

Referring to FIG. 9, the rearranged traffic 51 and the first time window between the first point of time 50 and the second point of time 52 are shown. Here, based on the accumulated score of the first time window being greater than or equal to the threshold, the rearranged traffic data may be determined as abnormal traffic. Further, based on the cumulative score of the first time window being less than the threshold, the rearranged traffic data may be determined as normal traffic.

Hereinafter, a cumulative score related to an operation for detecting abnormal traffic will be described in more detail. Here, the abnormal traffic may mean, for example, signaling DoS and scanning.

In some embodiments, the cumulative score may be determined based on the cumulative number of RRC release messages and RRC connection request messages transmitted and received by the target terminal. According to the present embodiment, the RRC release message and the RRC connection request message transmitted and received by the target terminal may be accumulated for a unit time of the size of the time window, so that abnormal traffic related to the signaling DoS can be detected. Here, the signaling DoS refers to an attack type in which an abnormal user terminal maliciously repeatedly allocates and releases radio resources to cause a large number of signaling messages.

In some other embodiments, the cumulative score may be determined based on the cumulative number of times that no Session Initiation Protocol (SIP) response message has been generated for a SIP request message transmitted by the target terminal. According to the present embodiment, the response failure history of the SIP request message transmitted by the target terminal may be accumulated for a unit time of the size of the time window, so that abnormal traffic related to scanning can be detected.

As described above, according to some embodiments, by updating the cumulative score for a unit time of the size of the time window, based on the cumulative score being equal to or greater than a preset threshold, the rearranged traffic data may be determined as abnormal traffic. At this time, by using the rearranged traffic data, a session reversal phenomenon may be corrected, and abnormal traffic detection performance can be improved.

In some other embodiments related to step S500, detecting abnormal traffic may include obtaining rearranged traffic data corresponding to the first time window between the first point of time and the second point of time and determining the rearranged traffic data as abnormal traffic using statistical data calculated from the rearranged traffic data corresponding to the first time window. According to the present embodiment, by using the traffic statistics information for each session calculated during the unit time of the size of the time window, it may be possible to detect abnormal traffic related to flooding that causes a failure due to an abnormally large amount of traffic flowing into the mobile communication network.

So far, signaling DoS, scanning, and flooding have been described as attack types determined as abnormal traffic. According to the above-described embodiments, by using the rearranged traffic data, a session reversal phenomenon may be corrected, and abnormal traffic detection performance can be improved. However, the attack type determined as abnormal traffic described above may be merely exemplary, and does not limit the scope of the present disclosure. Further, for more detailed information for detecting the attack types of signaling Dos, scanning, and flooding, related conventional techniques may be referred.

Figure 10:
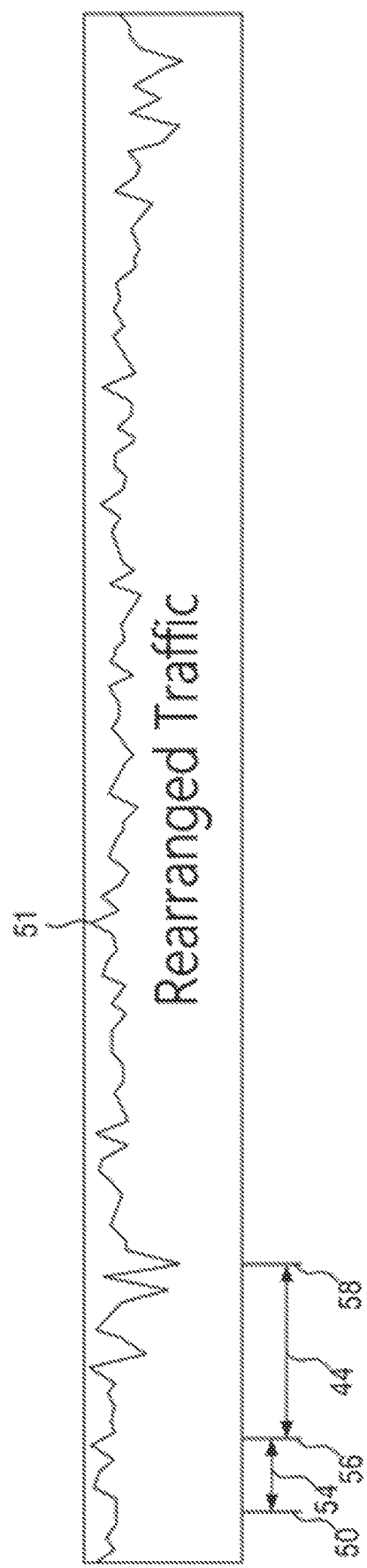

Hereinafter, an operation of detecting abnormal traffic by analyzing traffic data for each size unit of a time window will be described in more detail with reference to FIG. 10. FIG. 10 is an exemplary diagram for describing in more detail an operation of analyzing traffic data rearrangement method described with reference to FIG. 2.

Referring to FIG. 10, the third point of time 56 that has elapsed by the reference time interval 54 from the first point of time 50 may be used as the base point, and the rearranged traffic data corresponding to the second time window between the third point of time 56 and the fourth point of time 58 may be obtained. Based on the accumulated score of the second time window being greater than or equal to the threshold, the rearranged traffic data may be determined as abnormal traffic. Here, the reference time interval 54 may be determined according to a detection rule for abnormal traffic. For example, the cumulative score may be updated by partially overlapping the first time window and the second time window. For another example, the length of the reference time interval may be determined as the size of the time window so that the first time window and the second time window do not overlap. According to the present embodiment, the reference time interval may be dynamically determined according to a rule for detecting abnormal traffic.

The operation performed in step S500 described above may be performed, for example, by the traffic detection unit 950 illustrated in FIG. 12.

So far, a method for rearranging traffic data according to another embodiment of the present disclosure and its application fields have been described with reference to FIGS. 2 to 10. According to the present embodiment, by rearranging the traffic data, the session creation time reversal phenomenon that may occur in LTE EMM may be eliminated, and abnormal traffic may be more accurately detected.

Hereinafter, an exemplary computing device 1500 that can implement an apparatus and a system, according to various embodiments of the present disclosure will be described with reference to FIG. 11.

Figure 11:
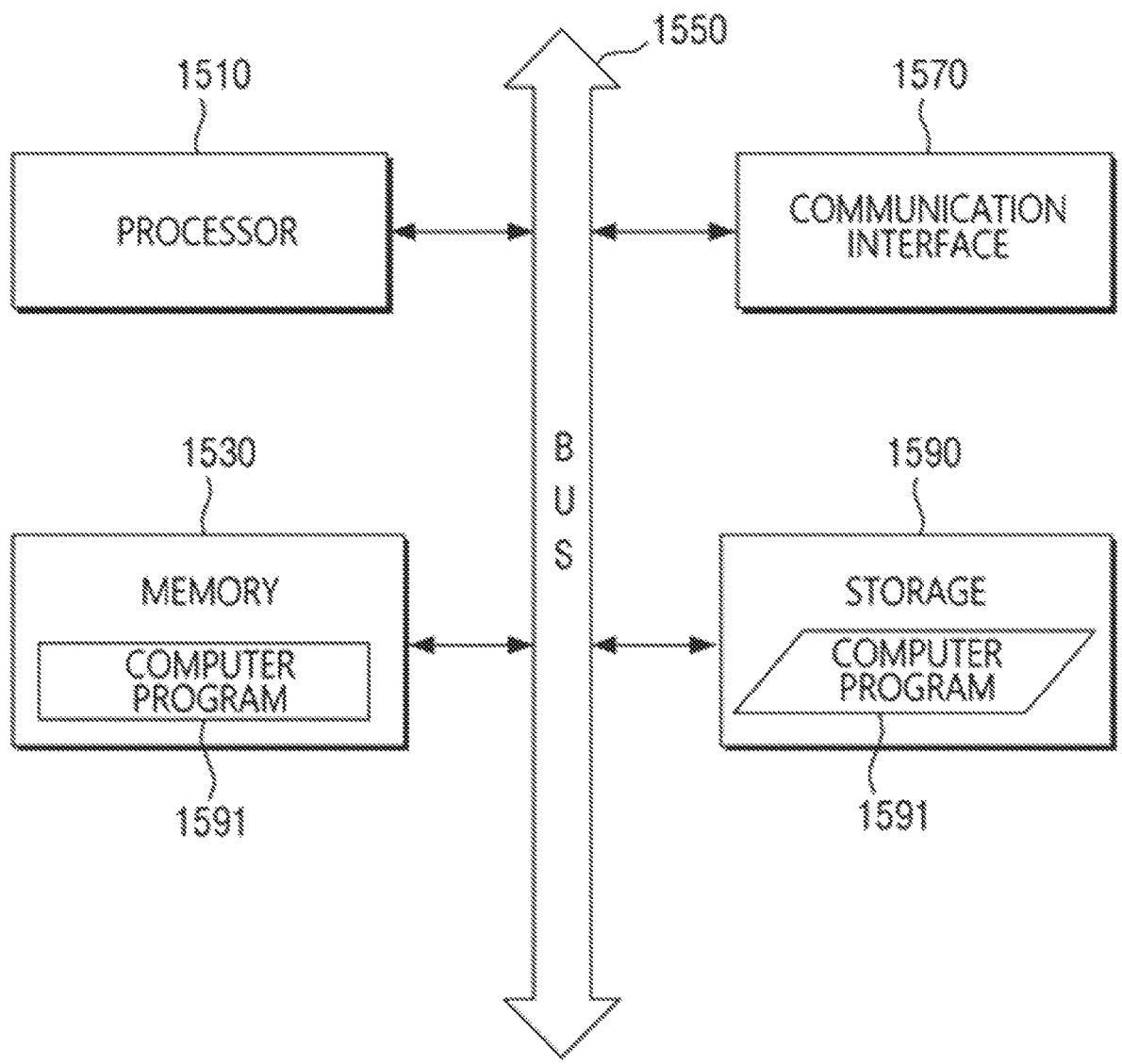
FIG. 11 is a hardware configuration diagram of an apparatus for rearranging traffic data according to another embodiment of the present disclosure.

FIG. 11 is an exemplary hardware diagram illustrating a computing device 1500.

As shown in FIG. 11, the computing device 1500 may include one or more processors 1510, a bus 1550, a communication interface 1570, a memory 1530, which loads a computer program 1591 executed by the processors 1510, and a storage 1590 for storing the computer program 1591. However, FIG. 11 illustrates the components related to the embodiment of the present disclosure. Therefore, it will be appreciated by those skilled in the art that the present disclosure may further include other general purpose components in addition to the components shown in FIG. 11.

The processor 1510 may control overall operations of each component of the computing device 1500. The processor 1510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1510 may perform calculations on at least one application or program for executing a method/operation according to various embodiments of the present disclosure. The computing device 1500 may have one or more processors.

The memory 1530 may store various data, instructions and/or information. The memory 1530 may load one or more programs 1591 from the storage 1590 to execute methods/operations according to various embodiments of the present disclosure. For example, based on the computer program 1591 being loaded into the memory 1530, the logic as shown in FIG. 2 may be implemented on the memory 1530. An example of the memory 1530 may be a RAM, but is not limited thereto.

The bus 1550 may provide communication between components of the computing device 1500. The bus 1550 may be implemented as various types of bus such as an address bus, a data bus and a control bus.

The communication interface 1570 may support wired and wireless internet communication of the computing device 1500. The communication interface 1570 may support various communication methods other than internet communication. To this end, the communication interface 1570 may be configured to include a communication module based on hardware and/or software well known in the art of the present disclosure.

The storage 1590 can non-temporarily store one or more computer programs 1591. The storage 1590 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1591 may include one or more instructions, on which the methods/operations according to various embodiments of the present disclosure may be implemented. Based on the computer program 1591 being loaded on the memory 1530, the processor 1510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to another computing device via a network such as internet and installed in the other computing device, being used in the other computing device.

Although the operations may be shown in an order in the drawings, those skilled in the art will appreciate that many variations and modifications can be made to the embodiments without substantially departing from the principles of the present disclosure. The disclosed embodiments of the present disclosure may be used in a generic and descriptive sense and not for purposes of limitation. The scope of protection of the present disclosure should be interpreted by the following claims, and all technical ideas within the scope equivalent thereto should be construed as being included in the scope of the technical idea defined by the present disclosure.

What is claimed is:

1. A method for rearranging traffic data performed by a computing device comprising:
   obtaining traffic data transmitted and received between a base station and a terminal;
   calculating a value of a Radio Resource Control (RRC) inactivity timer based on a RRC release message included in the traffic data;
   determining a size of a first time window using the calculated value of the RRC inactivity timer; and
   rearranging, for each time window having the determined size, the traffic data of a target terminal by an RRC connection request time.

2. The method of claim 1 further comprises
   analyzing the rearranged traffic data; and
   detecting abnormal traffic based on the analysis of the rearranged traffic data.

3. The method of claim 2, wherein detecting the abnormal traffic comprises
   obtaining the rearranged traffic data corresponding to a second time window between a first point of time and a second point of time, the second time window having the determined size; and
   determining the rearranged traffic data as abnormal traffic based on a first score derived from the second time window being greater than or equal to a preset threshold.

4. The method of claim 3, wherein the first score is determined based on an accumulated number of messages that include the RRC release message and an RRC connection request message, the RRC release message and the RRC connection request message being transmitted and received by the terminal.

5. The method of claim 3, wherein the first score is determined based on an accumulated number of times that no Session Initiation Protocol (SIP) response message has been generated for a SIP request message transmitted by the target terminal.

6. The method of claim 3 further comprises
   obtaining the rearranged traffic data corresponding to a third time window between a third point of time and a fourth point of time, the third point of time being after a reference time interval from the first point of time, the third time window having the determined size; and
   determining the rearranged traffic data as abnormal traffic based on the second score derived from the third time window being greater than or equal to a preset threshold.

7. The method of claim 6, wherein a length of the reference time interval is equal to the determined size of the first time window.

8. The method of claim 2, wherein detecting the abnormal traffic comprises
   obtaining the rearranged traffic data corresponding to a second time window between a first point of time and a second point of time, the second time window having the determined size; and
   determining the rearranged traffic data as abnormal traffic based on statistical data derived from the rearranged traffic data corresponding to the second time window.

9. The method of claim 1, wherein obtaining the traffic data comprises
   obtaining, in real time, the traffic data transmitted and received between the base station and the terminal.

10. The method of claim 1, wherein calculating the value of the RRC inactivity timer comprises
    measuring a length of time between a last RRC message and the RRC release message, the last RRC message being included in the traffic data; and
    determining the measured length of time as the value of the RRC inactivity timer.

11. The method of claim 1, wherein determining the size of the first time window comprises
    calculating a sum of the value of the RRC inactivity timer and a length of a detection duration; and
    determining the calculated sum as the size of the first time window.

12. The method of claim 11, wherein the length of the detection duration is a value determined based on a type of abnormal traffic.

13. The method of claim 1, wherein the target terminal is identified by International Mobile Subscriber Identity (IMSI) data included in the traffic data.

14. An apparatus for rearranging traffic data comprising:
    a processor;
    a network interface;
    a memory; and
    a computer program loaded into the memory and executed by the processor,
    wherein the computer program comprises
    an instruction for obtaining traffic data transmitted and received between a base station and a terminal;
    an instruction for calculating a value of a Radio Resource Control (RRC) inactivity timer based on a RRC release message included in the traffic data;
    an instruction for determining a size of a time window using the calculated value of the RRC inactivity timer; and an instruction for rearranging, for each time window having the determined size, the traffic data of a target terminal by an RRC connection request time.

15. The apparatus of claim 14, wherein the computer program further comprises
an instruction for analyzing the rearranged traffic data; and
an instruction for detecting abnormal traffic based on the analysis of the rearranged traffic data.

16. The apparatus of claim 14, wherein the instruction for obtaining the traffic data comprises
an instruction for obtaining, in real time, the traffic data transmitted and received between the base station and the terminal.

17. The apparatus of claim 14, wherein the instruction for calculating the value of the RRC inactivity timer comprises
an instruction for measuring a length of time between a last RRC message and the RRC release message, the last RRC message being included in the traffic data; and
an instruction for determining the measured length of time as the value of the RRC inactivity timer.

18. The apparatus of claim 14, wherein the instruction for determining the size of the first time window comprises
an instruction for calculating a sum of the value of the RRC inactivity timer and a length of a detection duration; and
an instruction for determining the calculated sum as the size of the time window.

19. The apparatus of claim 14, wherein the target terminal is identified by International Mobile Subscriber Identity (IMSI) data included in the traffic data.

20. A non-transitory computer-readable recording medium recording a computer program for rearranging traffic data including computer program instructions executable by a processor,
wherein the computer program instructions are executed by a processor of a computing device for performing operations comprising:
obtaining traffic data transmitted and received between a base station and a terminal;
calculating a value of a Radio Resource Control (RRC) inactivity timer based on a RRC release message included in the traffic data;
determining a size of a time window using the calculated value of the RRC inactivity timer; and
rearranging, for each time window having the determined size, the traffic data of a target terminal by an RRC connection request time.

* * * * *